United States Patent [19]
Dhein et al.

[11] 4,031,047
[45] June 21, 1977

[54] NON-AQUEOUS STOVING LACQUERS CONTAINING ε-CAPROLACTAM AS REACTIVE DILUENT

[75] Inventors: Rolf Dhein, Krefeld; Karl Zabrocki, Buettgen; Wolfgang Beer; Rolf Küchenmeister, both of Krefeld, all of Germany

[73] Assignee: Bayer Aktiengesellschaft, Germany

[22] Filed: Aug. 12, 1975

[21] Appl. No.: 604,013

[30] Foreign Application Priority Data

Feb. 7, 1975 Germany .......................... 2505246

[52] U.S. Cl. ................................ 260/21; 260/30.2;
428/458; 428/334
[51] Int. Cl.² ....................... C09D 3/52; C09D 3/66
[58] Field of Search ............................ 260/30.2, 21

[56] References Cited
UNITED STATES PATENTS 2,878,201  5/1959  Beindorff et al. ................ 260/30.4

FOREIGN PATENTS OR APPLICATIONS 623,925  7/1961  Canada ............................ 260/30.2

Primary Examiner—Stanford M. Levin
Attorney, Agent, or Firm—Connolly and Hutz

[57] ABSTRACT

Non-aqueous polyester and alkyd resin stoving lacquers containing ε-caprolactam as a so-called reactive diluent with a high solids content and containing correspondingly small quantities of volatile solvents and yield excellently hard coatings which are not brittle.

1 Claim, No Drawings

NON-AQUEOUS STOVING LACQUERS CONTAINING ε-CAPROLACTAM AS REACTIVE DILUENT

Non-aqueous stoving lacquers which consist of polyesters, cross-linking melamine resins and reactive diluents are known. They are distinguished by their high solids content and correspondingly small quantities of solvents which evaporate in the stoving process. These lacquer systems are therefore very economical to use as well as being labour saving since thicker coats may be obtained from them by one application.

Thus, for example, lacquer systems which contain melamine resins, polyesters with hydroxyl and carboxyl groups which may be modified with fatty acids and low molecular or monomolecular hydroxyl compounds which contain at least two hydroxyl groups per molecule have been described in German Offenlegungsschrift No. 2,253,300. These hydroxyl compounds act as so-called "reactive diluents", that is to say, they confer on the lacquer the necessary viscosity for its application and they remain in the polymer network during and after the stoving process. They are capable of completely or partially replacing conventional volatile organic solvents. Propane-1,2-diol, diethylene glycol and glycerol are examples of suitable hydroxyl compounds for this purpose.

When polyhydric alcohols are used as reactive diluents, there is a risk that the hardened lacquer film may become more hydrophilic due to an increase in the number of free hydroxyl groups in the binder, and this increased hydrophilic character is liable to have a deleterious effect on the quality of the lacquer coats. Although such phenomena may be compensated by increasing the proportion of cross-linking agent, such a measure generally reduces the elasticity of the film.

Moreover, the monomolecular and low molecular weight polyhydric alcohols tend to evaporate under the conditions employed for stoving. Castor oil, which is used according to German Offenlegungsschrift No. 2,253,300, has a strong plasticizing effect on the lacquer film which in many cases makes it unusable.

It has now surprisingly been found that ε-caprolactam used in combination with optionally oil-modified polyesters and cross-linking aminoplast resins remains almost quantitatively in the film when used in the given proportions and stoving conditions. This finding is all the more surprising since mixtures of polyesters and ε-caprolactam liberate considerable quantities of the lactam under the same conditions if no aminoplast resins are present.

To this is added the fact that in contrast to polyfunctional polyhydric alcohols, such a monofunctional reactive diluent would be expected to cause a decrease in the technical properties of the lacquer when aminoplast resins are cross-linked since monofunctional reactants reduce the cross-linked density and would therefore expect to reduce the hardness, elasticity and stability of the films.

In the contrary, however, the lacquer systems according to the invention are capable of giving rise to unexpectedly hard coatings which are not brittle.

The viscosity lowering effect of ε-caprolactam as reactive diluent is known in isocyanate chemistry (K. Wagner, Angewandte Makromolekulare Chemie 37 (1974), No. 538, page 59 et seq). Diisocyanate polyaddition products of this type are used as foam and coating substances, but in the field of lacquers, they are used in the form of two component systems owing to their high reactivity. In many cases, however, if numerous colour shades are required to be constantly available and stored over prolonged periods, the use of two component lacquers is a disadvantage.

The present invention thus relates to non-aqueous stoving lacquers which consist of a mixture of polyesters, aminoplast resins and ε-caprolactam in addition to any solvents, pigments or other auxiliary agents and additives. Stoving lacquers of the following compositions are particularly preferred:

a. 35 – 89% by weight, based on the sum of components (a) to (c), of a polyester with an oil content of from 0 to 50% by weight, based on the sum of the polyester components, an acid number of from 5 to 50, an OH number of from 70 to 450 and an average molecular weight of from 300 to 6000;
b. 10 – 40% by weight, based on the sum of components (a) to (c), of a cross-linking aminoplast resin with an average molecular weight of from 120 to 1250; and
c. 1 – 25% by weight, based on the sum of components (a) to (c), of ε-caprolactam; in which the molar ratio caprolactam/aminoplast resin should be from 0.001:1 to 7:1.

Molecular weights below 5000 are determined by vapour pressure osmosis in dioxane and acetone (if both values differ from each other, the lower value is considered to be the more accurate one); molecular weights above 5000 are determined by membrane osmosis in acetone.

Melamine-formaldehyde condensation products and ureaformaldehyde condensation products may be regarded as examples of aminoplast resins. Melamine resins include all conventional melamine-formaldehyde condensates, either unetherified or etherified with saturated monohydric alcohols which contain from 1 to 4 carbon atoms, for example the melamine resins described in French Pat. No. 943,411 or by D. H. Solomon in The Chemistry of Organic Filmformers, 235–240, John Wiley & Sons, Inc. New York, 1967. The melamine resins may also be partially or completely replaced by other cross-linking aminoplasts, e.g. those described in "Methoden der Organischen Chemie" (Houben-Weyl), Vol. 14/2, part 2, 4th Edition, Georg Thieme Verlag, Stuttgart, 1963, 319 et seq.

By "polyesters" are meant polycondensates prepared from alcohols and carboxylic acids according to known methods, for example as defined in Römpp's Chemielexikon, Vol. 1, page 202, Franckh'sche Verlagsbuchhandlung, Stuttgart, 1966, or as described by D. H. Solomon, The Chemistry of Organic Filmformers, pages 75–101, John Wiley & Sons Inc., New York, 1967.

Suitable alcohol components for the synthesis of the polyesters include aliphatic, cycloaliphatic and/or aromatic alcohols with 1 to 6, preferably 1 to 4, hydroxyl groups attached to non-aromatic carbon atoms which alcohols contain 1 to 24 carbon atoms per molecule, e.g. glycols such as ethylene glycol, propylene glycol, butanediols or hexanediols; ether alcohols; diethylene and triethylene glycols; oxethylated bisphenols, perhydrogenated bisphenols, trimethylolethane, trimethylolpropane, glycerol, pentaerythritol, dipentaerythritol, mannitol and sorbitol; monohydric alcohols which have a chain terminating action, such as propanol, butanol, cyclohexanol and benzyl alcohol, may also be included in the condensation reaction.

Suitable polybasic acid components for the synthesis of the polyesters include aliphatic, cycloaliphatic saturated or unsaturated and/or aromatic di-, tri- and tetrabasic, carboxylic acids containing 4 to 12 carbon atoms per molecule and the ester-forming derivatives thereof (e.g. anhydrides and esters), e.g. phthalic acid anhydride, isophthalic acid, terephthalic acid, tetrahydro- und hexahydro-phthalic acid anhydride, trimellitic acid anhydride, pyromellitic acid anhydride, maleic acid anhydride, adipic acid and succinic acid anhydride as well as halogenated acids, such as chlorophthalic acid and HET-acid.

Suitable monocarboxylic acids for the synthesis of the polyesters are aliphatic, cycloaliphatic saturated or unsaturated and/or aromatic monocarboxylic acids containing 6 to 24 carbon atoms per molecule such as benzoic acid, butyl benzoic acid, toluene carboxylic acid, hexahydrobenzoic acid, abietic acid, lactic acid as well as fatty acids and derivatives thereof such as linseed oil, soya oil, wood oil, safflower oil, castor oil, cotton seed oil, ground nut oil, tall oil fatty acid, the fatty acids of soya oil, wood oil, safflower oil and dehydrated ricinoleic acid and products obtained from natural unsaturated oils or fatty acids by conjugation or isomerisation; suitable saturated fatty acids include, for example, coconut fatty acids and $\alpha$-ethyl-hexanoic acid.

The polyesters and alkyd resins may be prepared by condensation in known manner by the conventional methods. The mixture of raw materials is generally reacted at temperatures of from 140° to 250° C. under an inert gas atmosphere, e.g. nitrogen, with removal of water until the desired acid number is reached.

Particularly suitable polyesters and alkyd resins are, for example, the polyester polysemiesters obtained by a two-stage reaction from polyesters or alkyd resins which contain hydroxyl groups and from acid anhydrides (German Auslegeschrift No. 1,519,146), tetrahydrophthalic acid polysemiesters being particularly suitable.

The conventional organic lacquer solvents may be used, for example petroleum hydrocarbons; aromatic solvents such as xylene; esters, such as ethyl acetate or butyl acetate; ketones or alcohols. They are preferably added in quantities of from 1 to 50%, by weight, based on the sum of components (a) to (c).

It is sometimes advisable to add small quantities of mono- or polyhydric alcohols, such as ethanol, isopropanol, butanol; glycol monoalkylethers or propylene glycol to regulate the viscosity. Among the mixtures with alcohols, those containing the alcohol and the lactam in equivalent amounts should be particularly mentioned. Solvents may be completely dispensed with if the lacquer system already has a suitable viscosity for processing. This is particularly the case if polyesters with low molecular weights are used.

$\epsilon$-Caprolactone may also be added as additional reactive diluent in quantities of from 1 to 20% by weight, based on the sum of components (a) to (c). Pigments such as titanium dioxide, carbon black, talcum, barium sulphate, zinc sulphate, strontium chromate, barium chromate, molybdenum red, iron yellow, iron red, iron black and hydrated iron oxides, or pigments, such as cadmium yellow, cadmium red or organic pigments and dyes, may be added to pigment the lacquers by the known, conventional methods.

Auxiliary agents and additives, such as catalysts, inhibitors, levelling agents, matting agents, anti-settling agents, defoaming agents, plasticizers and other auxiliary agents and additives commonly used in lacquer technology, may also be added to the lacquers according to the invention.

The stoving lacquer systems according to the invention are generally applied by the usual methods, such as casting, spraying, dipping and brush coating, and they are usually applied in thicknesses of from 40 to 100 $\mu$. They may be hardened by stoving them at temperatures of from 80° to 280° C, preferably at from 100° to 140° C.

The following Example illustrates the invention. Percentages are percentages by weight if not otherwise specified.

EXAMPLE

An alkyd resin is prepared from 585 g of pentaerythritol, 764 g of 1,1,1-trimethylolpropane, 1500 g of soya oil fatty acid, 366 g of benzoic acid 144 g of $\alpha$-ethylhexanoic acid and 1302 g of phthalic acid anhydride by esterifying the reaction mixture at 180° to 220° C in a nitrogen atmosphere until an acid number of about 6 is reached. The alkyd resin obtained is thereafter acidified to an acid number of about 21 by the addition of 182 g of tetrahydrophthalic acid anhydride.

The resin is dissolved to form a 76.5% solution in ethyl glycol acetate, and the following substances are added to 85 g of this solution:

(a)

15.0 g of $\epsilon$-caprolactam,
25.0 g of an approximately 70% solution of a cross-linking alkoxylated melamine resin, e.g. "Maprenal VMF 52/7" (cross-linking aminoplast resin, manufactured by the firm of Cassella, Frankfurt/Main, Germany).

COMPARISON EXPERIMENTS

The above test is repeated, but (a) is replaced by (b), (c) or (d) in three samples.

(b)

15.0 g of propane-1,2-diol,
25.0 g of an approximately 70% solution of a cross-linking alkoxylated melamine resin (Maprenal VMF 52/7)

(c)

15.0 g of castor oil,
25.0 g of an approximately 70% solution of a cross-linking alkoxylated melamine resin (Maprenal VMF 52/7)

(d)

15.0 g of glycerol,
25.0 g of an approximately 70% solution of a cross-linking alkoxylated melamine resin (Maprenal VMF 52/7)

Samples (b) and (d) are incompatible and do not form clear, homogeneous lacquer mixtures. (a) and (c)

were applied to metal sheets in a thickness of 180 μ and stoved at 125° C for 30 minutes. Sample (a) gave rise to a hard, scratch-resistant, smooth, elastic film; (c) gave rise to a smooth film which was not nail hard and could easily be scratched from its support.

We claim:
1. A non-aqueous stoving lacquer containing
   a. 35–89% by weight, based on the sum of components (a) to (c), of a polyester with an oil content of from 0 to 50% by weight, based on component (a), an acid number of from 5 to 50, an OH number of from 70 to 450 and an average molecular weight determined by vapor pressure osmosis of from 300 to 6000;
   b. 10–40% by weight, based on the sum of components (a) to (c), of an aminoplast resin with an average molecular weight determined by vapor pressure osmosis of from 120 to 1250 and
   c. 1 to 25% by weight, based on the sum of components (a) to (c), of ε-caprolactam.

the molar ratio of caprolactam to aminoplast resin being from 0.001:1 to 7:1.

* * * * *